United States Patent [19]

Houck et al.

[11] Patent Number: 5,703,774
[45] Date of Patent: Dec. 30, 1997

[54] VARIABLE SLEW SELECTOR SWITCH SYSTEM

[75] Inventors: Andrew W. Houck, Woodinville; Stephen R. Gibbs, Bellevue, both of Wash.

[73] Assignee: The Boeing Company, Seattle, Wash.

[21] Appl. No.: 438,976

[22] Filed: May 11, 1995

[51] Int. Cl.$^6$ .................. G06F 3/02; G06F 19/00
[52] U.S. Cl. .................. 364/424.06; 364/424.12
[58] Field of Search .......... 364/424.06, 424.012; 340/971, 973, 977, 972

[56] References Cited

U.S. PATENT DOCUMENTS

| | | | |
|---|---|---|---|
| 4,086,632 | 4/1978 | Lions | 364/444 |
| 4,331,039 | 5/1982 | Ruge | 74/10.41 |
| 4,902,878 | 2/1990 | Smith et al. | 219/486 |
| 5,345,807 | 9/1994 | Butts et al. | 73/4 R |

Primary Examiner—Michael Zanelli
Attorney, Agent, or Firm—Christensen O'Connor Johnson & Kindness PLLC

[57] ABSTRACT

A numerical input to a computer, such as an input of runway altitude to an aircraft control system, is controlled by a switch having five positions as follows: "off" for maintaining the current value, "slow increment" for increasing the value slowly, "fast increment" for increasing the value more quickly, "slow decrement" for slow decrease in the value, and "fast decrement" for faster decrease in the value. A processor monitors the current switch position. Depending on the period that a particular position is selected, the value fed to the control system and shown on a display can be "bumped" unit by unit (small units for a "slow" selection, and large units for a "fast" selection) or scrolled up or down at a rate which accelerates. Bumping is achieved by toggling the knob quickly from the off, or the next closest position, to the desired slow or fast position. Scrolling or "continuous slew" is selected by maintaining the switch in the desired slow or fast position.

21 Claims, 5 Drawing Sheets

VARIABLE SLEW SELECTOR SWITCH SYSTEM

FIELD OF THE INVENTION

The present invention relates to a multiple position data input device for controlling a numerical display and a corresponding input to a computer, particularly a numerical input to an aircraft control system.

BACKGROUND OF THE INVENTION

For control systems of a sophisticated aircraft, it is necessary for various numerical parameters to be set by the pilot. For example, known autopilot system require that the pilot input the runway altitude prior to takeoff and prior to landing. Similarly, calibration of the autopilot may require that the pilot input the current barometric pressure at the origination airport and, later, at the destination airport. In one known system, such input can be accomplished by use of a control knob rotatable clockwise to increase a numerical value representing altitude or barometric pressure, and counterclockwise to decrease the numerical value. An associated display informs the pilot of the current value. If the control knob is turned slowly, the value is changed by predefined units, one unit at a time. Changing the value by a large amount requires several turns. To speed up the input in such a situation, a microprocessor senses the speed at which the knob is turned. Above a predetermined speed of rotation, the value is increased more quickly, so that fewer turns are required for large changes in the value. As the desired value is reached, the pilot turns the knob more slowly so that it returns to the slower, one unit at a time change in value.

Even with the speed sensing feature described above, large changes in value still require several turns, particularly if the minimum increment is small. For runway altitude, it may be necessary to input values from 0 feet to 16,000 feet, and the previously accepted unit increment was 10 feet. More sophisticated systems require a more precise control, such as the capability of incrementing the value by 1 foot, which would require even more turns of the control knob to reach a desired value, and/or a more precise sensing of the movement of the control knob, making the input system more difficult to operate.

SUMMARY OF THE INVENTION

The present invention provides a system for changing a numerical input to a computer, such as an input of runway altitude or barometric pressure to a computer associated with an aircraft control system. In the preferred embodiment, input is by use of a switch having five positions, "off" for maintaining the current value, "slow increment" for increasing the value slowly, "fast increment" for increasing the value more quickly, "slow decrement" for slow decrease in the value, and "fast decrement" for faster decrease in the value. A microprocessor or central processor monitors the current switch position. Depending on the period that a particular state is selected, the value fed to the control system and shown on a display can be "bumped" unit by unit (small units for a "slow" selection, and large units for a "fast" selection) or scrolled up or down at a rate which accelerates. Preferably, all inputs are by use of a single control knob which is spring biased to a central "off" position. Clockwise rotation through a small angle moves the control knob to the slow increment position, whereas a small counterclockwise rotation of the control knob changes the selected state to slow decrement. Similarly, clockwise rotation of the control knob through a larger angle is used to select fast increment, and larger counterclockwise rotation of the control knob is used to select fast decrement. Bumping is achieved by toggling the knob quickly from off, or the next closest position, to the desired slow or fast position. Scrolling or "continuous slew" is selected by maintaining the switch in the desired slow or fast position.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figures 1, 2:
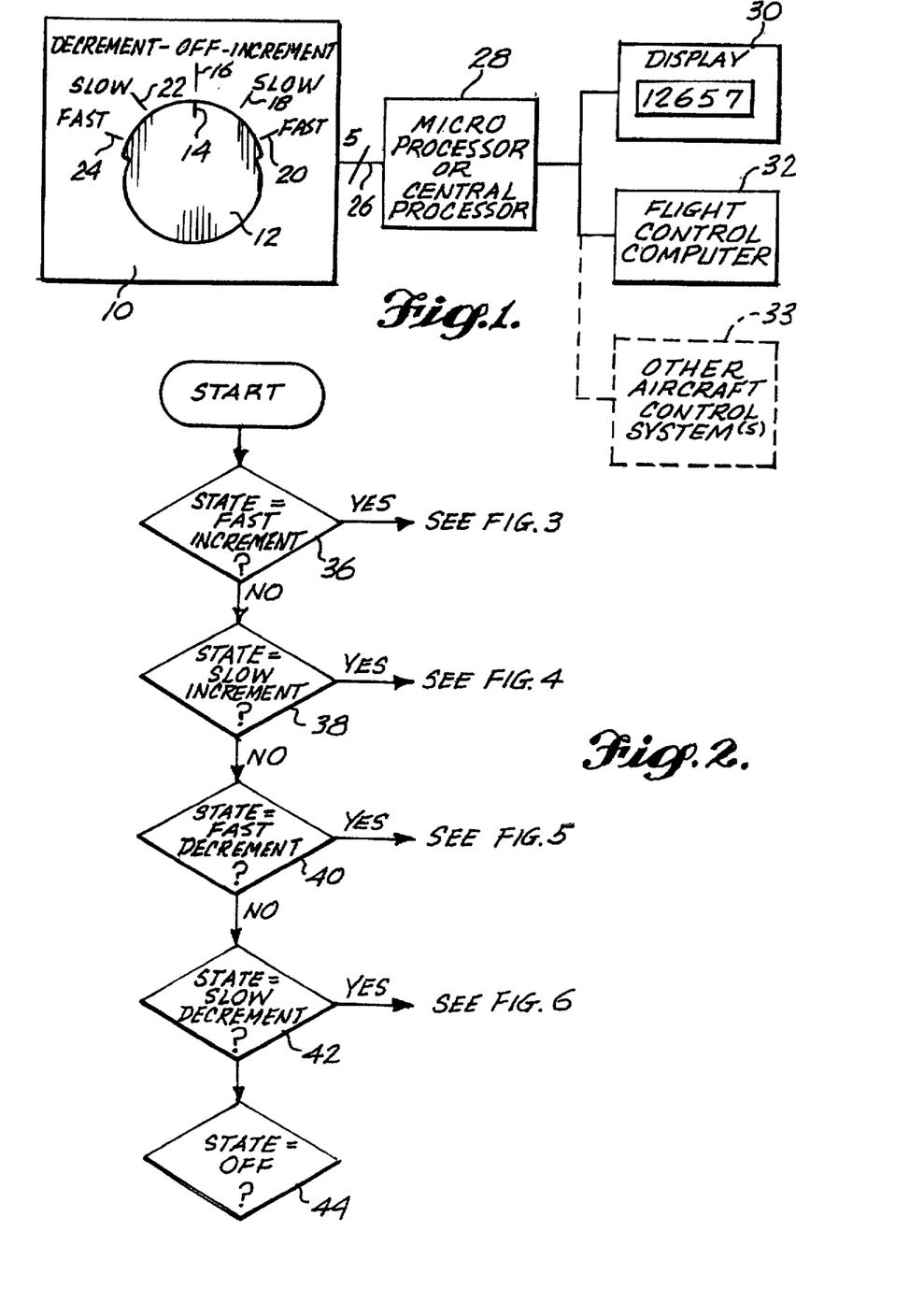
FIG. 1 is a block diagram of a variable slew selector switch system in accordance with the present invention, including a multiple position data input device and a processor for sensing a selected input and for updating a display and the corresponding numerical value provided to a computer.
FIG. 2 is a flow diagram illustrating the procedure of monitoring the selected input by the processor.

With reference to FIG. 1, the variable slew selector switch system in accordance with the present invention uses a manually operated data input device 10 having several discrete possible selections. In the preferred embodiment, the input device uses a rotary control knob 12 resiliently biased to a central "off" position. In the drawing, such central position is indicated by registration of the knob index mark 14 with the central "off" index mark 16 on a control panel. From the off position, the control knob can be rotated clockwise through a small angle to a "slow increment" position indicated by an index mark 18, or through a larger angle to a "fast increment" position indicated by an index mark 20. Similarly, from the off position the control knob can be rotated counterclockwise through a small angle to a "slow decrement" position (index mark 22) or through a larger angle to a "fast decrement" position (index mark 24).

A databus 26 connects the input device 10 with a microprocessor or a central processor 28. Such databus conveys five binary inputs to the processor. Each binary input indicates whether or not one of the five possible positions of the switch has been selected. Based on the selection, the processor updates a display 30 of a current numerical value that has been selected by the user, and provides the corresponding value to a computer 32. For example, the display can indicate a selected runway altitude, and the computer 32 can be a flight control computer making decisions based on the selected altitude. As indicated in broken lines, the value can be fed to any other desired control system 33.

In general, selection of the off position results in maintaining the numerical value supplied by the microprocessor at the current value. The slow and fast increment positions are used to increase the value, whereas the slow and fast decrement positions are used to decrease the value. The value can be "bumped" either up or down in small units, such as 1 foot units in the case of altitude, by toggling the knob between the off position and the slow increment position (for increase) or the slow decrement position (for decrease). Alternatively, the value can be bumped by larger units, such as 10 feet, by toggling the switch between the appropriate slow and fast positions. A scroll or "continuous slew" function is selected by maintaining the switch in one of the four slow or fast positions for a predetermined period. In that case, the processor automatically continues to increase or decrease the numerical value at a rate which, preferably, accelerates from a minimum rate to a maximum rate. For a slow slew function, the minimum rate, maximum rate and acceleration are less than for a selected fast slew function. By use of the input device, a pilot can quickly and easily change the numerical value and obtain a desired precise selection within the maximum range permitted. In the case of runway altitude, the value can be set at any whole number between 0 and 16,000, representing feet above sea level, by use of the bumping and/or slew functions.

FIG. 2 illustrates the basic routine followed by the processor. Decision boxes 36, 38, 40, 42 and 44 represent the substantially continuous monitoring of the state of the data input device. In the preferred embodiment, the selected position of the switch is evaluated every 50 milliseconds. If the off state is detected, no change is made in the processor output to the display or flight control computer. Rather, the processor simply waits the predetermined period (50 milliseconds) before again evaluating the state of the input device.

Figure 3:
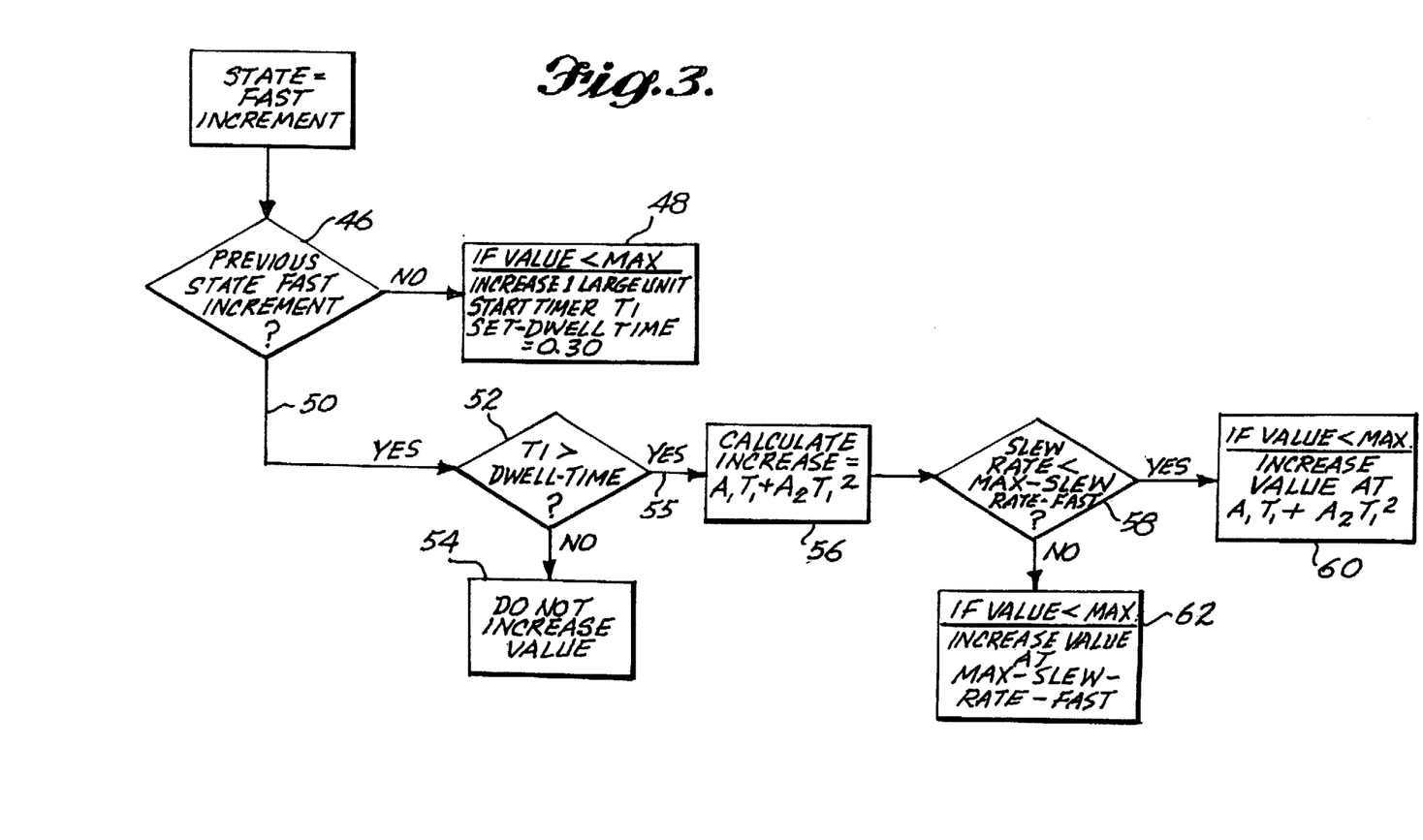
FIG. 3 is a flow diagram illustrating the procedure of updating the numerical value if a first input (fast increment) is selected.

FIG. 3 illustrates the subroutine followed if the fast increment state is detected. First, a determination is made of whether the previous detected state was also the fast increment state (decision box 46). If not, the display and output to the computer are incremented by one large unit (such as 10 feet), as indicated by box 48, provided that the maximum permissible value (such as 16,000 feet) is not exceeded. At the same time, a timer T1 is started and a "dwell time" value is set. For the preferred embodiment, the dwell time can be about 0.30 second for fast increment.

Note that each time the user moves the selector switch to the fast increment position, the value, if less than maximum, is bumped one large unit. Thus, the speed at which consecutive bumps may be achieved is limited only by the agility of the user, assuming that the user is not able to toggle the switch faster than 50 milliseconds between manipulations. However, it is quite possible that a fast (large unit) bump will be desired, but that the switch will remain in the fast increment position for more than the 50 millisecond recycle time. In that case, from decision box 46, the subroutine follows path 50 to a decision box 52 where an evaluation is made as to whether or not the predetermined dwell time has been exceeded. If not, the value is not changed, as indicated by box 54. Consequently, if the switch is moved to fast increment and held in that position for less than the dwell time, a single bump of one large unit results.

Continuing with the condition in which the fast increment state has been selected, if the switch is held in the fast increment position for longer than the dwell time, the scroll or continuous slew function has been selected (path 55 from box 52). As represented by box 56, the system calculates the change in the new value in accordance with the following formula:

Increase in value=$A_1T_1+A_2T_1^2$ $A_1$ represents the initial rate of change of the fast slew function; $T_1$ equals the time since the fast increment state was selected by the user; and $A_2$ equals the acceleration factor. In a representative embodiment for ranway altitude, $A_1$=40 small units (feet) and $A_2$=30 small units (feet). Thus, the initial fast slew rate is 40 small units (feet) per second, and the rate accelerates at 30 small units (feet) per second squared. In addition, a maximum fast slew rate is set, 1,000 units per second in the representative embodiment. In all fast functions, the amount of increase is preferably rounded to the nearest large unit (10 feet). As represented by box 58, if the calculated increase does not exceed the maximum rate of increase, the value is increased by the calculated amount, up to the maximum value for the display (box 60). If the calculated increase exceeds the maximum rate, the value is increased at the maximum rate (box 62).

In summary, toggling the selector switch to the fast increment position results in bumping the selected value one large unit (10 feet), whereas maintaining the selector switch in the fast increment position for longer than the predetermined dwell time results in execution of the fast scroll or slew function which begins at a minimum selected rate ($A_1$) with a predetermined acceleration over time ($A_2$ units per second$^2$) up to a predetermined maximum rate (Max-Slew-Rate-Fast).

Figure 4:
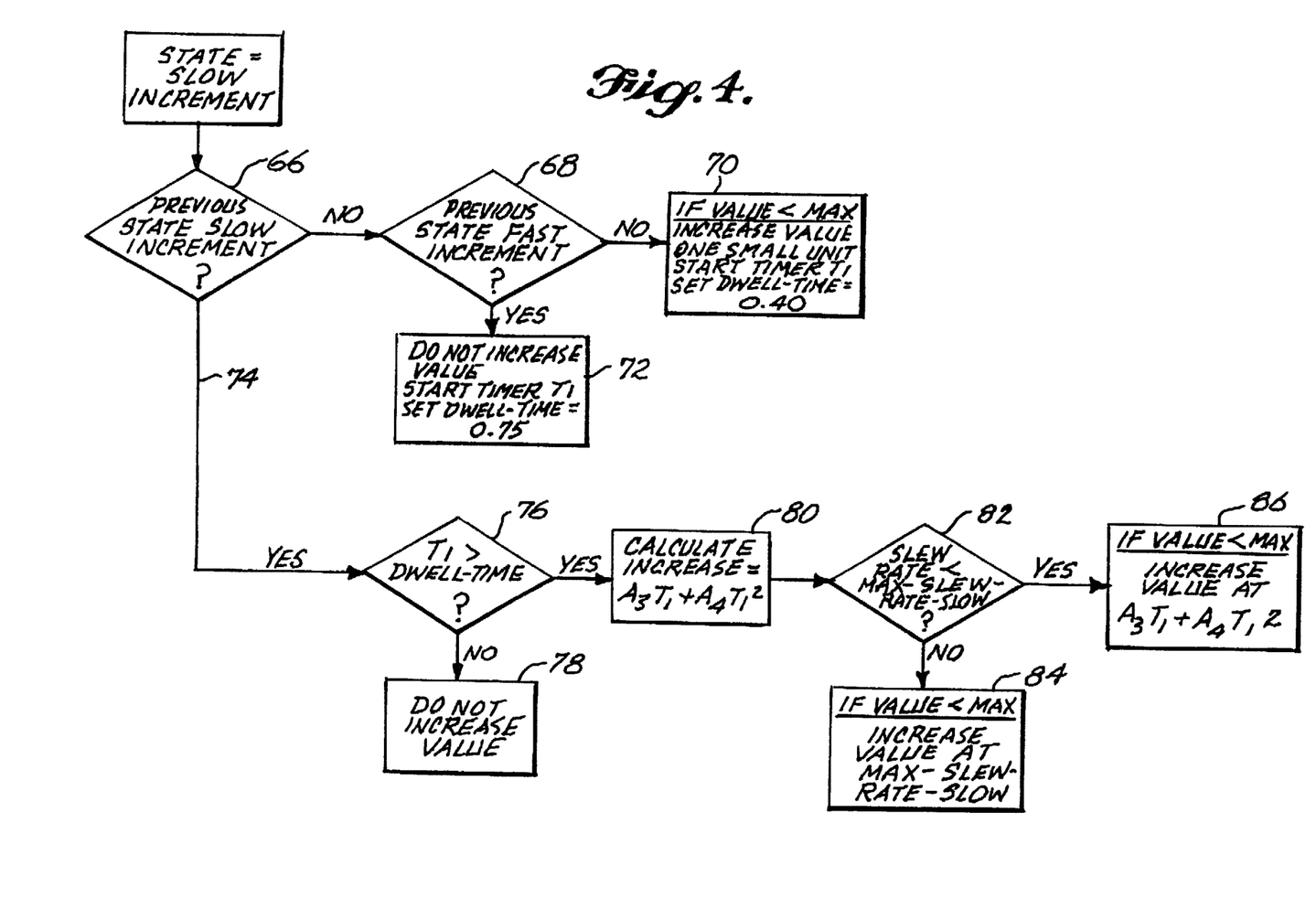
FIG. 4 is a flow diagram of the procedure of updating the numerical value if a second input (slow increment) is selected.

Smaller, slower changes in the settable parameter are achieved by use of the slow increment selection. With reference to FIG. 4, upon detection of the slow increment state of the data input device, the first step is evaluation of whether or not slow increment was the immediately preceding detected state as represented by box 66. For an initial selection, the answer will be "no" and the slow increment subroutine proceeds to box 68 for a determination of whether the previous state was fast increment. If not, and if the settable value is not at maximum, the value is immediately increased by one small unit, such as 1 foot, as represented by box 70. Timer $T_1$ is started and a predetermined dwell time is set, similar to the fast bump operation described above. In the case of slow increment, the dwell time preferably is about 0.40 second. However, if it is detected at box 68 that the input device has just returned to the slow increment state from the fast increment state, the user is returning from a fast bump or fast slew function. In that case, the value is not increased (see box 72). Rather, timer $T_1$ is started anew and a different, longer dwell time is set, preferably about 0.75 second. This allows the user to remain in the slow slew position for a somewhat longer period between fast bumps or when returning to off from fast increment.

Continuing with FIG. 4, in the case where the slow slew state is selected and that state was previously selected (path 74 from box 66), a determination is made as to whether the dwell time has been exceeded (box 76). If not, the settable value is not changed (see box 78). If the dwell time has been exceeded, i.e., the switch has been held in the slow increment position, a slow scroll or slew function has been selected and the increase in value is determined by the following equation as represented by box 80:

Increase in value=$A_3T_1+A_4T_1^2$ $A_3$ is the initial slow slew rate of change, and $A_4$ is the slow slew rate acceleration. In the representative embodiment for ranway altitude, $A_1$=1.5 units (feet) so that the initial slow slew rate is 1.5 units per second; and the slow slew rate acceleration factor $A_4$ is 0.41 units (feet), so that the slow slew rate acceleration is 0.41 units per second squared. In addition, in the slow slew function, a maximum slow slew rate of change is set (Max-Slew-Rate-Slow), preferably 5 units per second. From this point in the subroutine, slow slew operation is identical to fast slew operation, except for the rate of change (constants $A_3$ and $A_4$), the maximum rate of change and the precision of the rounding. In the slow slew function, all units are rounded to the nearest small unit (1 foot) rather than to the nearest large unit (10 feet). The rate of change accelerates until the maximum rate has been achieved (box 82), and the scrolling or slew continues until the settable value reaches maximum (boxes 84 and 86).

Figure 5:
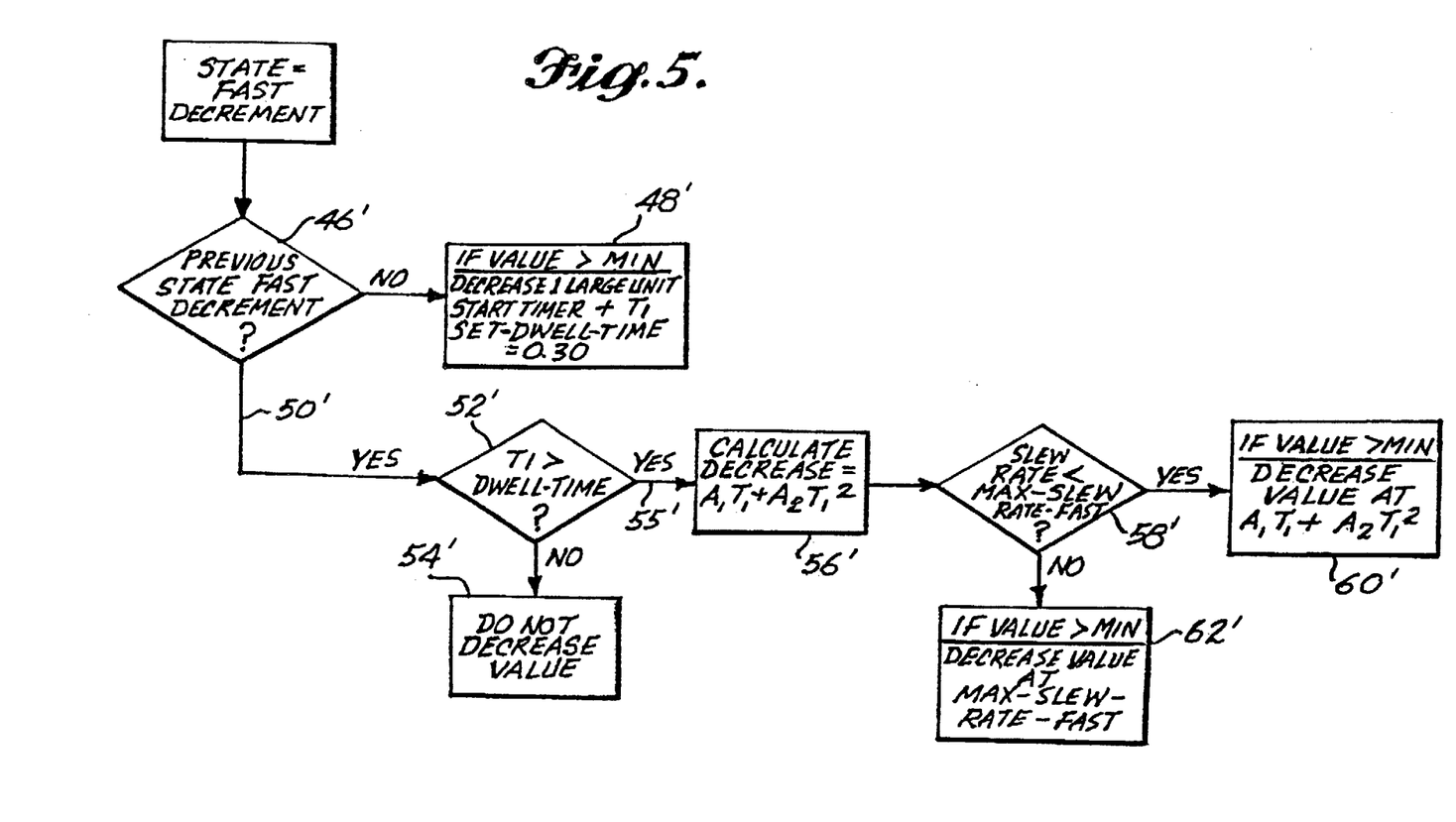
FIG. 5 is a flow diagram of the procedure of updating the numerical value if a third input (fast decrement) is selected.

With reference to FIG. 5, if the fast decrement state is detected, the steps followed correspond to the steps for fast increment, but for decreasing the settable value rather than for increasing it. First, it is determined whether the previously detected state was fast decrement (box 46'). If not, the subroutine proceeds to box 48', and if the value is greater than the minimum value, the value is immediately decreased by one large unit (10 feet), the timer is started and the dwell time is set (0.30 second, just as for fast increment). If fast decrement was previously selected (path 50' from box 46'), an evaluation is made as to whether or not the dwell time has been exceeded (box 52'). If not, the value is not decreased (box 54'). If the dwell time has been exceeded, i.e., the switch has been held in the fast decrement position for longer than the dwell time (path 55' from box 52'), the amount of decrease is calculated in accordance with the same formula as for fast increment (box 56'). Then a determination is made as to whether the rate of decrease is greater than the maximum permitted rate (box 58'). Depending on that determination, and if the value is greater than minimum, the value is either decreased by the calculated mount (box 60') or at the maximum rate (box 62'), rounded to the closest large unit in each instance.

Figure 6:
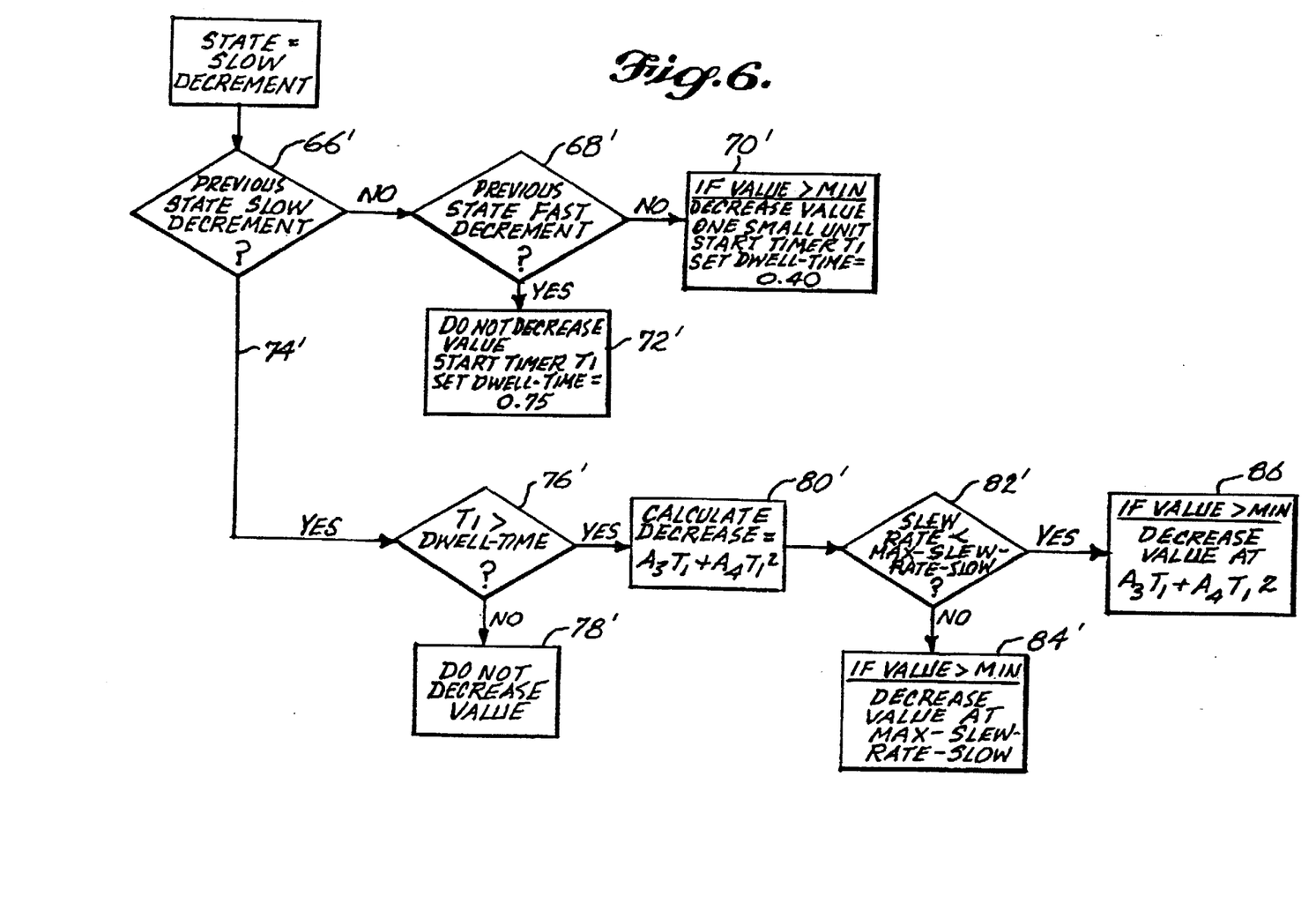
FIG. 6 is a flow diagram of the procedure of updating the numerical value if a fourth input (slow decrement) is selected.

With reference to FIG. 6, slow decrement operation corresponds to slow increment operation. When slow decrement is first selected, the subroutine proceeds from box 66' to box 68' where an evaluation is made as to whether or not the previous date was fast decrement. If not, and if the value is greater than the preselected minimum, the value is immediately decreased by one small unit, the timer is started and the dwell time is set (box 70'). If it is determined at box 68' that the previous state was fast decrement, the value is not decreased, the timer is started and the dwell time is set to the larger value (box 72'). If the previous state was slow decrement (path 74' from box 66'), an evaluation is made as to whether or not the dwell time has been exceeded (box 76'). If not, the value is not decreased (box 78'). If the dwell time has been exceeded, the decrease is calculated in accordance with the same formula as for slow increment (box 80'), and a determination is made as to whether or not the slew rate is less than the preselected maximum (box 82'). If so, and if the value is greater then the minimum value, the value is decreased by the calculated amount (box 86'); otherwise, the value is decreased in accordance with the maximum rate (box 84'); rounded to the closest small unit in each instance.

While the preferred embodiment of the invention has been illustrated and described, it will be appreciated that various changes can be made therein without departing from the spirit and scope of the invention. For example, the system is easily adaptable to different settable parameters and different ranges by simply adjusting the minimum and maximum values, the small and large units, the fast and slow slew minimum rates, the acceleration factors, and the fast and slow maximum rates of change. Summarizing the preferred values for runway altitude input:

| | |
|---|---|
| Minimum value | 0 feet |
| Maximum value | 16,000 feet |
| Slow increment step size (small unit) | 1 foot |
| Fast increment step size (large unit) | 10 feet |
| Dwell time for slow slew | 0.40 second |
| Dwell time for fast slew | 0.30 second |
| Dwell time for slow slew when stepping by large units | 0.75 second |
| A1 = Initial fast slew rate | 40 feet/second |
| A2 = Fast slew acceleration | 30.0 feet/second$^2$ |
| A3 = Initial slow slew rate | 1.5 feet/second |
| A4 = Slow slew acceleration | 0.41 feet/second$^2$ |
| Max-slew-rate-fast | 1,000 feet/second |
| Max-slew-rate-slow | 5 feet/second |
| Recycle time | 50 milliseconds |

The embodiments of the invention in which an exclusive property or privilege is claimed are defined as follows:

1. A variable slew selector switch system for controlling change in a numerical value input to a computer comprising:
   a data input device having a plurality of discrete manually selectable states including a first state for selecting fast change in a numerical value, a second state for selecting slow change in the numerical value and a third state for selecting no change in a numerical value; and
   a processor for automatically monitoring the selected state of the data input device and for changing the numerical value as follows:
   (a) if the first state is selected for a period less than a first predetermined dwell time period, automatically change the numerical value by a first predetermined increment;
   (b) if the first state is selected for a period greater than the first predetermined dwell time period, automatically substantially continuously change the numerical value at a first rate of change;
   (c) if the second state is selected for a period less than a second predetermined dwell time period, automatically change the numerical value by a second predetermined increment different from the first predetermined increment;
   (d) if the second state is selected for a period greater than the second predetermined dwell time period, automatically substantially continuously change the numerical value at a second rate of change different from the first rate of change; and
   (e) if the third state is selected, do not change the numerical value.

2. The switch system defined in claim 1, including a display for visually depicting the current numerical value.

3. The switch system defined in claim 1, in which the first predetermined dwell time period is less than the second predetermined dwell time period.

4. The switch system defined in claim 1, in which the first predetermined increment is greater than the second predetermined increment.

5. The switch system defined in claim 1, in which the first rate of change is greater than the second rate of change.

6. The switch system defined in claim 1, in which the first rate of change accelerates over time if the first state is continuously selected for a period greater than the first predetermined dwell time period.

7. The switch system defined in claim 6, in which the second rate of change accelerates over time if the second state is selected for a period greater than the second predetermined dwell time period.

8. The switch system defined in claim 1, in which the first rate of change accelerates over time from a first predetermined minimum rate to a first predetermined maximum rate if the first state is selected continuously for a period greater than the first predetermined dwell time period.

9. The switch system defined in claim 8, in which the second rate of change accelerates over time from a second predetermined minimum rate to a second predetermined maximum rate if the second state is selected for a period greater than the second predetermined dwell time period.

10. The switch system defined in claim 1, in which the data input device is a single rotary control knob having different rotary positions for the different states.

11. A variable slew selector switch system for controlling change in a numerical value input to a computer comprising:
 a data input device having a plurality of discrete states manually selectable by a user including a first state for selecting increase in the numerical value, a second state for selecting decrease in a numerical value and a third state for selecting no change in the numerical value; and
 a processor for automatically monitoring the selected state of the data input device and for changing the numerical value as follows:
  (a) if the first state is selected for a period less than a first predetermined dwell time period, increase the numerical value by a first predetermined increment;
  (b) if the first state is selected for a period greater than the first predetermined dwell time period, substantially continuously increase the numerical value at a first rate of change which accelerates automatically without change in the manual selection by the user;
  (c) if the second state is selected for a period less than a second predetermined dwell time period, decrease the numerical value by a second predetermined increment;
  (d) if the second state is selected for a period greater than the second predetermined dwell time period, substantially continuously change the numerical value at a second rate of change which accelerates automatically without change in the manual selection by the user; and
  (e) if the third state is selected, do not change the numerical value.

12. The switch system defined in claim 11, in which the data input device is a single rotary control knob having different rotary positions for the different states.

13. A variable slew selector switch system for controlling change in a numerical value input to an aircraft control system comprising:
 a manually operated data input device having a plurality of discrete states manually selectable by a user including a first state for selecting fast increase in the numerical value, a second state for selecting slow increase in the numerical value, a third state for selecting fast decrease in the numerical value, a fourth state for selecting slow decrease in the numerical value, and a fifth state for selecting no change in the numerical value; and
 a processor for automatically monitoring the selected state of the data input device, for conveying the numerical value to the aircraft control system and for changing the numerical value as follows:
  (a) if the first state is selected for a period less than a first predetermined dwell time period, increase the numerical value by a first predetermined increment;
  (b) if the first state is selected for a period greater than the first predetermined dwell time period, substantially continuously increase the numerical value at a first rate of change;
  (c) if the second state is selected for a period less than a second predetermined dwell time period, increase the numerical value by a second predetermined increment different from the first predetermined increment;
  (d) if the second state is selected for a period greater than the second predetermined dwell time period, substantially continuously increase the numerical value at a second rate of change;
  (e) if the third state is selected for a period less than the first predetermined dwell time period, decrease the numerical value by the first predetermined increment;
  (f) if the third state is selected for a period greater than the first predetermined dwell time period, substantially continuously decrease the numerical value at the first rate of change;
  (g) if the fourth state is selected for a period less than the second predetermined dwell time period, decrease the numerical value by the second predetermined increment;
  (h) if the fourth state is selected for a period greater than the second predetermined dwell time period, substantially continuously decrease the numerical value at the second rate of change;
  (i) if the fifth state is selected, do not change the numerical value.

14. The switch system defined in claim 13, in which the first and second rates of change automatically accelerate over time without change in the manual selection by the user.

15. The switch system defined in claim 13, in which the data input device is a single rotary control knob having different rotary positions for the different states.

16. The method of controlling change in a numerical value input to an aircraft control system which comprises:
 automatically monitoring the state of a data input device having a plurality of discrete states manually selectable by a user including a first state for selecting fast change in the numerical value, a second state for selecting slow change in the numerical value, and a third state for selecting no change in the numerical value; and
 updating the numerical value based on the selected state as follows:
  (a) if the first state is selected for a period less than a first predetermined dwell time period, change the numerical value by a first predetermined increment;
  (b) if the first state is selected for a period greater than the first predetermined dwell time period, substantially continuously change the numerical value at a first rate of change;
  (c) if the second state is selected for a period less than a second predetermined dwell time period, change the numerical value by a second predetermined increment different from the first predetermined increment;
  (d) if the second state is selected for a period greater than the second predetermined dwell time period, substantially continuously change the numerical value at a second rate of change; and
  (e) if the third state is selected, do not change the numerical value.

17. The method defined in claim 16, including, if the first state is selected for a period greater than the first predetermined dwell time period, substantially continuously changing the numerical value at the first rate of change which automatically accelerates from a first minimum rate to a first maximum rate without change in the manual selection by the user.

18. The method defined in claim 16, including, if the second state is selected for a period greater than the second predetermined dwell time period, substantially continuously changing the numerical value at the second rate of change which automatically accelerates from a second minimum rate to a second maximum rate without change in the manual selection by the user.

19. The method defined in claim 16, including rounding the change in the numerical value to the closest first predetermined increment if the first state is selected.

20. The method defined in claim 19, including rounding the change in the numerical value to the closest second predetermined increment if the second state is selected.

21. The method of controlling change in a numerical value input to an aircraft control system which comprises:

automatically monitoring the state of a data input device having a plurality of discrete states manually selectable by a user including a first state for selecting increase in the numerical value, a second state for selecting decrease in a numerical value and a third state for selecting no change in the numerical value; and updating the numerical value based on the selected state as follows:

(a) if the first state is selected for a period less than a first predetermined dwell time period, increase the numerical value by a first predetermined increment;

(b) if the first state is selected for a period greater than the first predetermined dwell time period, substantially continuously increase the numerical value at a first rate of change which accelerates automatically without change in the manual selection by the user;

(c) if the second state is selected for a period less than a second predetermined dwell time period, automatically decreasing numerical value by a second predetermined increment;

(d) if the second state is selected for a period greater than the second predetermined dwell time period, substantially continuously change the numerical value at a second rate of change which accelerates automatically without change in the manual selection by the user; and (e) if the third state is selected, do not change the numerical value.

* * * * *